United States Patent [19]
Howells

[11] Patent Number: 6,054,178
[45] Date of Patent: Apr. 25, 2000

[54] FABRIC MESH REINFORCED MONOLITHIC THERMOPLASTIC MEMBRANE

[75] Inventor: Harvey A. Howells, Richardson, Tex.

[73] Assignee: Serrot International, Inc., Henderson, Nev.

[21] Appl. No.: 09/385,705

[22] Filed: Aug. 30, 1999

Related U.S. Application Data

[60] Continuation of application No. 08/698,302, Aug. 15, 1996, abandoned, which is a division of application No. 08/391,441, Feb. 21, 1995, abandoned.

[51] Int. Cl.$^7$ ........................................ B05D 1/34
[52] U.S. Cl. .................. 427/209; 427/211; 427/398.1; 427/398.2; 427/288; 442/43; 442/58; 442/62
[58] Field of Search .................... 427/209, 211, 427/398.1, 398.2, 288; 442/19, 43, 45, 58, 62, 65

[56] References Cited

U.S. PATENT DOCUMENTS

| | | |
|---|---|---|
| 1,775,631 | 9/1930 | Carlton . |
| 1,983,349 | 1/1934 | Dreyfus . |
| 2,034,008 | 3/1936 | Taylor . |
| 2,125,764 | 8/1938 | Benoit . |
| 2,199,526 | 5/1940 | McCowen . |
| 2,220,140 | 11/1940 | Bartling et al. . |
| 2,386,626 | 1/1945 | Nadeau et al. . |
| 2,404,590 | 7/1946 | Nantz . |
| 2,431,873 | 1/1947 | Kennelly . |
| 2,433,515 | 12/1947 | Jahoda . |
| 2,436,335 | 2/1948 | Simonsen . |
| 2,523,037 | 9/1950 | Mathes . |
| 2,536,657 | 1/1951 | Reese . |
| 2,544,259 | 3/1951 | Duccini et al. . |
| 2,559,893 | 7/1951 | Nadeau et al. . |
| 2,566,441 | 9/1951 | Camras . |
| 2,594,222 | 4/1952 | Sandora et al. . |
| 2,643,955 | 6/1953 | Powers et al. . |
| 2,653,113 | 9/1953 | Banigan . |
| 2,678,285 | 5/1954 | Browning . |
| 2,689,801 | 9/1954 | D'Alelio . |
| 2,697,058 | 12/1954 | Lasak . |
| 2,712,987 | 7/1955 | Storrs et al. . |
| 2,793,136 | 5/1957 | Root . |
| 2,794,677 | 6/1957 | Collardin et al. . |
| 2,804,337 | 8/1957 | Marantz . |
| 2,909,443 | 10/1959 | Wolinski . |
| 2,961,335 | 11/1960 | Shepard . |
| 3,073,528 | 1/1963 | Wilson et al. . |
| 3,171,599 | 3/1965 | Rotolico . |
| 3,415,450 | 12/1968 | Hawk, Sr. . |
| 3,441,215 | 4/1969 | Cape . |
| 3,442,454 | 5/1969 | Stenger et al. . |

(List continued on next page.)

OTHER PUBLICATIONS

DVS Technical Committee, Working Group, "Plastics, Welding and Adhesive Bonding", Testing of Welded Joints of Thermoplastics—Test Methods–Requirements—Report, Mar. 1986, Doc. XVI–491–86, Deutscher Verand for Schweisstechnik e.V.

Deutscher Verband Für Schweisstechnik E.V., "Prüfen von Schweißverbindungen aus thermoplastischen Kunstoffen, Zugversuch", Jul. 1985, Richtlinie DVS 2203 Teil 2.

*Primary Examiner*—Elizabeth M. Cole
*Attorney, Agent, or Firm*—William G. Lane, Esq.

[57] ABSTRACT

A method of manufacturing a fabric mesh reinforced monolithic thermoplastic membrane. The open mesh fabric is drawn into the gap between two calender rollers of a membrane extruder, a molten first thermoplastic material is extruded into the throat of the gap between the first roller and the first side of the fabric mesh, while a second molten thermoplastic material is simultaneously extruded into the throat of the gap between the second roller and the second side of the fabric mesh. The composite material is then drawn through the gap between the first and second rollers to force the molten first and second thermoplastic materials into and through the open mesh of the fabric to fuse and bond the molten first and second thermoplastic materials in and about the fabric mesh to form the fabric mesh reinforced monolithic thermoplastic membrane.

20 Claims, 1 Drawing Sheet

U.S. PATENT DOCUMENTS

| | | |
|---|---|---|
| 3,460,764 | 8/1969 | Wallis . |
| 3,565,345 | 2/1971 | Moltzan . |
| 3,894,120 | 7/1975 | Frese et al. . |
| 3,946,136 | 3/1976 | Fitz et al. . |
| 3,973,059 | 8/1976 | Brown et al. . |
| 4,048,419 | 9/1977 | Frese et al. . |
| 4,087,577 | 5/1978 | Hendrickson ............................ 428/110 |
| 4,096,016 | 6/1978 | Pohl . |
| 4,239,797 | 12/1980 | Sachs . |
| 4,278,483 | 7/1981 | Mansolillo . |
| 4,327,130 | 4/1982 | Pipkin .................................... 427/209 |
| 4,368,846 | 1/1983 | Rau et al. . |
| 4,439,385 | 3/1984 | Kuhls et al. . |
| 4,488,918 | 12/1984 | Jofs . |
| 4,501,783 | 2/1985 | Hiragami et al. . |
| 4,543,106 | 9/1985 | Parekh . |
| 4,608,287 | 8/1986 | Biotteau . |
| 4,623,589 | 11/1986 | Simmonds, Jr. . |
| 4,632,309 | 12/1986 | Reimer . |
| 4,666,761 | 5/1987 | Stamper et al. ........................ 428/215 |
| 4,788,088 | 11/1988 | Kohl . |
| 4,885,201 | 12/1989 | Brandt . |
| 4,934,595 | 6/1990 | Reimer . |
| 5,075,135 | 12/1991 | Brandt . |
| 5,139,853 | 8/1992 | Mathieson . |
| 5,167,895 | 12/1992 | Lueghamer . |
| 5,258,217 | 11/1993 | Lewis . |

FABRIC MESH REINFORCED MONOLITHIC THERMOPLASTIC MEMBRANE

FIELD OF THE INVENTION

This application is a continuation of U.S. patent application Ser. No. 08/698,302, filed Aug. 15, 1996, now abandoned, which is a divisional application of abandoned U.S. patent application Ser. No. 08/391,441, filed Feb. 21, 1995.

This invention is directed to a open mesh fabric reinforced monolithic thermoplastic membrane which can be used as a roofing membrane, or as a liner for ponds, reservoirs, canals, pits and the like.

BACKGROUND OF THE INVENTION

For several years, fabric mesh reinforced thermoplastic membranes have been available for use as a roofing membrane, and pond, reservoir, pits liner, canal and the like. The conventional way of making such membranes is to extrude molten thermoplastic onto one side of a fabric mesh to weld the fabric mesh to one side of the thermoplastic membrane. The resulting composite is then heated and a second layer of molten thermoplastic is extruded onto the other side of the fabric mesh to cover the fabric mesh and to weld the second thermoplastic to the first thermoplastic.

Although this product has been made for a number of years, it has not been completely satisfactory. The membrane normally does not have a smooth surface; normally both surfaces of the membrane reflect the fabric mesh. The membrane is normally rippled and is not entirely flat because of the temperature differences between the heated first extruded thermoplastic and the molten second extruded thermoplastic. The existing membrane is truly a three-ply product having a first thermoplastic layer and a second thermoplastic layer which are partially welded together with a fabric mesh disposed in between. Because of the construction and method of manufacture, there are ply adhesion problems and ply delamination is not unknown. Because of the way the existing membranes are manufactured, there is little choice regarding the surface finish of the finished material.

It is an object of the present invention to provide a fabric mesh reinforced monolithic thermoplastic membrane for use as a roofing membrane, and reservoir, pond, canal and pit liner.

A further object of the present invention is to provide a fabric mesh reinforced monolithic thermoplastic membrane having at least one smooth surface.

An even further object of the present invention is to provide a fabric mesh reinforced monolithic thermoplastic membrane that lays flat and is ripple free.

An additional object of the present invention is to provide a fabric mesh reinforced monolithic thermoplastic membrane that is not subject to delamination.

Another additional object of the present invention is to provide a one step method for producing a fabric mesh reinforced monolithic thermoplastic membrane.

An even further additional object of the present invention is to provide an improved roofing system employing a fabric mesh reinforced monolithic thermoplastic membrane having a light reflective surface.

Still another object of the present invention is to provide a liner system for canals, ponds, reservoirs, pits and the like comprising a fabric mesh reinforced monolithic thermoplastic membrane that contains carbon black pigment.

These and other objects of the present invention are set forth below.

SUMMARY OF THE INVENTION

The present invention is directed to a fabric mesh reinforced monolithic thermoplastic membrane comprising an open mesh fabric mesh having a first side and a second side and a thermoplastic layer encapsulating the fabric mesh, the thermoplastic layer having a first side and a second side, the first and second sides of the thermoplastic layer having been extruded simultaneously but separately in the molten state onto the first and second sides of the mesh fabric, respectively, to form a single thermoplastic layer, the thermoplastic material striking through, i.e., extending through, the open mesh of the fabric mesh and surrounding the mesh fibers.

In one embodiment of the present invention, the fabric mesh can be woven mesh. In an alternative embodiment, the fabric mesh can be a non-woven mesh. The mesh can be a plastic mesh, a natural fiber mesh or a metal mesh. It is not essential to the present invention that the thermoplastic material actually bond to the surface of the mesh. The mesh fibers or strands can be smooth fibers or surface configured fibers to get a better grip between the mesh and the thermoplastic material. Irregular surface fiber mesh can be corrugated, have protrusions or hollows or other irregular surface configurations that hold the fabric mesh in the thermoplastic material.

In one of the embodiments of the present invention, the thermoplastic material can be a polypropylene based, thermoplastic olefin. In one of the preferred embodiments of the present invention, the thermoplastic on the first side of the membrane will be pigmented with a white pigment, such as titanium dioxide, to act as a light reflectant and the second side of the thermoplastic layer will be pigmented with carbon black.

The present invention is also directed to a method of manufacturing a fabric mesh reinforced monolithic thermoplastic membrane which comprises drawing an open mesh fabric mesh into the gap between the two calender rollers of a membrane extruder, the mesh having first and second sides; extruding a molten first thermoplastic into the throat of the gap between the first roller and the first side of the fabric mesh and simultaneously extruding a molten second thermoplastic into the throat of the gap between the second roller and the second side of the fabric mesh; and drawing the composite of the molten first thermoplastic, the fabric mesh and the molten second thermoplastic through the gap between the first and second rollers and to force the molten first and second thermoplastic into and through the open mesh of the fabric mesh to fuse and bond the molten first and second thermoplastic and to bond the thermoplastics in and about the fabric mesh to form the fabric mesh reinforced monolithic thermoplastic membrane.

In the preferred embodiment of the present invention, one of the rollers is cooled to cool the molten second thermoplastic to a temperature below the thermoplastic melt temperature. The first roller is heated to a temperature between 85° and 110°, preferably about 105° C., to heat the molten first thermoplastic to improve fusing and bonding of the first and second thermoplastic.

In another preferred embodiment of the present invention, the fabric mesh reinforced monolithic thermoplastic membrane is maintained in contact with the first roller as it leaves the gap to insure complete fusing of the thermoplastics and imprint a finish on the first side of the membrane.

In another preferred step of the present invention, after the first side of the membrane leaves the surface of the first roller, the second side of the membrane is placed in contact with the surface of a third cooling roller to cool the second side of the membrane.

In a further preferred embodiment of the present invention, the membrane after contact cooling with the third roller is rapidly cooled to ambient temperature with air flow.

In a preferred embodiment of the present invention, the fabric mesh is maintained under slight tension as it is drawn into the gap between the first and second rollers to maintain the fabric mesh in a substantially plainer configuration.

In one embodiment of the present invention, the first and second rollers are rotated at the same speed. Preferably, the rollers are maintained at the same speed that the mesh is drawn into the gap between the first and second rollers.

In an alternative embodiment of the present invention, the rollers are rotated at different speeds with respect to each other. Preferably at least one roller is rotated at the same speed as the mesh fabric is drawn into the gap between the first and second rollers.

In one embodiment of the present invention, the fabric mesh is fed into the center of the gap between the first and second rollers with equal amounts of first and second thermoplastic being extruded into the throat of the extruder.

In an alternative embodiment of the present invention, the mesh is fed into the center of the gap between the first and second rollers with a greater amount of first thermoplastic being extruded into the throat than the amount of second thermoplastic being extruded into the throat.

In still another embodiment of the present invention, the mesh is drawn into the gap off center with equal amounts of first and second thermoplastic being extruded into the throat of the extruder.

In an alternative embodiment of the present invention, the mesh is drawn into the gap off center with a greater amount of first thermoplastic being extruded into the throat than the amount of second thermoplastic being extruded into the throat.

In the preferred embodiment of the present invention, the first and second thermoplastic are the same thermoplastic polymer, however, the first and second thermoplastic may have different pigments such as carbon black and titanium dioxide. Different thermoplastic materials of different thermoplastic polymers may be used in the production of the membrane of the present invention as long as the two thermoplastic materials can fuse together to form a monolithic structure. If the thermoplastic materials exhibit substantially different thermal coefficients of expansion, the resulting membrane may not be suitable for applications where the two sides of the membrane are exposed to different temperature gradients because of possible buckling. Preferably the two thermoplastics have similar melt indexes.

The present invention is also directed to a roofing system comprising a fabric mesh monolithic thermoplastic roofing membrane encapsulating an open mesh fabric mesh reinforcing material, the thermoplastic on the top side of the membrane containing a light reflective pigment.

In the preferred embodiment of the roofing membrane, the thermoplastic is polypropylene based thermoplastic olefin. Preferably the thermoplastic contains a UV absorbent if the membrane is for outdoor use. Preferably the top side of the roofing membrane contains titanium dioxide pigment as the light reflectant pigment. Most preferably, the bottom side of the membrane is pigmented with carbon black.

The present invention is also directed to a liner material for ponds, canals, reservoirs and pits comprising a fabric mesh monolithic thermoplastic encapsulating an open mesh fabric reinforcing material, the thermoplastic of the membrane containing carbon black pigment.

Preferably, the thermoplastic material contains a UV absorbent. Preferably, the thermoplastic material is polypropylene.

DETAILED DESCRIPTION OF THE INVENTION

Figure 1:
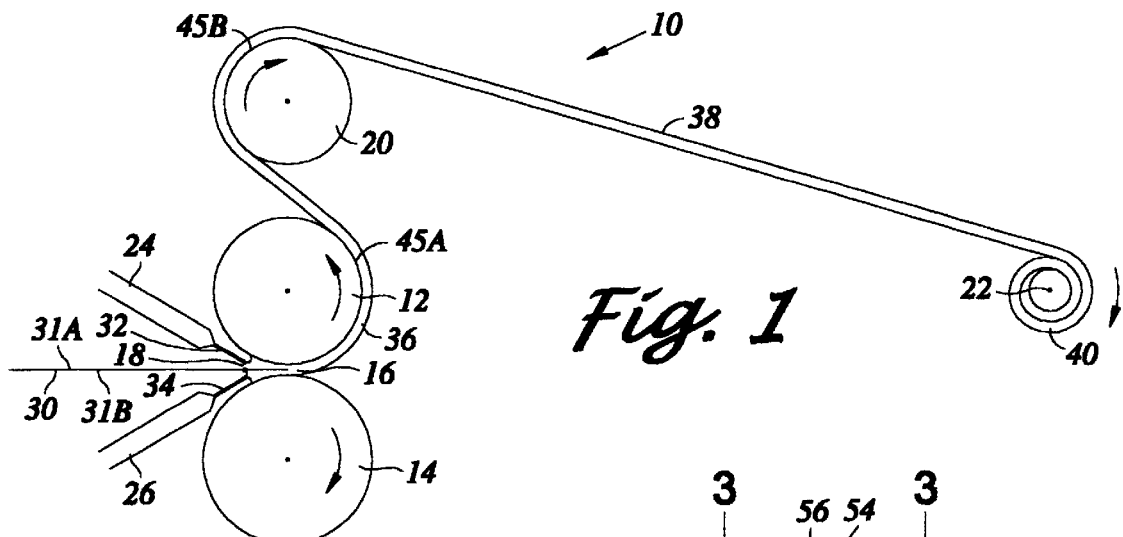
FIG. 1 is a schematic view of the membrane extrusion process of the present invention.

Referring to FIG. 1, the membrane extruder 10 comprises a first calender roller 12, a second calender roller 14 and a cooling roller 20. A take up roller 22 is provided to reel up the membrane 44 as a roll 40. The space between the first and second roller is referred to as the roller gap 16 and the entrance into the gap is referred to as the throat 18. A first die or extruder nozzle 24 is located approximate the first roller in front of the throat and a second die or extruder nozzle 26 is located approximate the second roller in front of the throat.

Open mesh fabric mesh 30 is drawn into the throat 18 under slight tension to maintain the open mesh fabric mesh in a plainer configuration. The first molten thermoplastic is extruded from the first nozzle 24 into the throat between the first side 31A of the fabric mesh and the first roller 12. Simultaneously, the second molten thermoplastic 34 is extruded from the second nozzle 26 into the throat between the second side 31B and the second roller 14. The rollers are rotated as shown by the arrows to draw the open mesh fabric and the extruded thermoplastic into the gap 16 between the rollers to force the thermoplastic into the open mesh of the open mesh fabric mesh, to fuse the first and second molten thermoplastic together and to encapsulate the fabric mesh to form the membrane. The membrane is drawn from the gap at a speed of 4 to 8 feet per minute, although other speeds can be employed. As the membrane leaves the throat, the first side of the membrane 45A is kept in contact with the surface of the first roller 12 to maintain the temperature of the polypropylene membrane above 100° C. to complete the fusing of the thermoplastic. The maintenance temperature varies for different thermoplastic melting points. The membrane 44 leaves the first roller and moves to the third roller 20 wherein the second side 45B of the membrane contacts the surface of the roller 20 to cool the second side and solidify it. The second and third rollers 14 and 20 are cooled with ambient temperature water. After leaving the gap and until the membrane leaves the third roller, the thermoplastic is still in a plastic or soft state, but has set, and can be imprinted with surface features if desired. Between the third roller 20 and the take up reel 22, the membrane is exposed to cooling air to cool the membrane down to ambient temperature. The cooled membrane is rolled into a roll 40 for transportation and storage.

The process permits the fabric mesh reinforced thermoplastic membrane to be made in a single step and it provides a means for producing a single layer monolithic membrane wherein the reinforcing fabric mesh is fully encapsulated in the single layer of thermoplastic. The two extruded thermoplastics from the first and second nozzles are fully fused together in the gap by the action of the rollers to form a single layer. Thus, the membrane cannot delaminate, the fabric mesh is fully integral with the layer to provide maximum strength and reinforcement, and the fabric mesh is fully protected by the thermoplastic layer. In addition, because the membrane is prepared in a single step from two extruded molten thermoplastics at approximately the same temperature and which are cooled at approximately the same rate, the resulting membrane lies flat and is not subject to rippling like conventional fabric mesh reinforced thermoplastic membranes which are prepared in two or more separate steps.

Virtually any type of thermoplastic can be utilized in the present process. Preferably the thermoplastic has a melt index of at least 1.0 when tested at 2.14 Kg. at 190° C. Thermoplastics with higher melt indexes are less viscous when melted and flow easier into and through the open mesh that thermoplastics with lower melt indexes. Preferably the first and second thermoplastics have similar melt indexes; this makes the membrane more amenable to hot air weldability—sheets of membrane are frequently welded together to form continuous membranes for roofing, lines and the like—because both sides of the membrane heat up at the same rate. Thermoplastics with melt indexes of 1.0 are easier to hot air weld in the field. Polypropylene based thermoplastic olefin (a thermoplastic mixture of ethylene, propylene, polypropylene and EPR manufactured by Himont North America, Inc.) has been found to be very suitable because of its thermoplastic properties, its strength and its resistance to oxidation and UV. However, other thermoplastic polymeric material such as polyethylene, polystyrene, ABS, polyester thermoplastic, urethane and polyvinyl plastics can also be utilized. The membrane can be prepared from two types of thermoplastic polymeric material with one type of thermoplastic polymeric material being extruded from the first die or extruded nozzle 24 and the second thermoplastic polymeric material being extruded from the second die or extruder nozzle 26. The two thermoplastics must be compatible and must be able to fuse together to create the desired membrane. Preferably, the two thermoplastics will have similar thermal coefficients of expansion so that the resulting membrane will lie flat and not ripple.

The fabric mesh can be made of plastic material such as polyester or nylon, natural fibers such as cotton or hemp, or metal. A fabric mesh must be employed that has an open mesh and that can withstand the temperature of the molten thermoplastic during the extrusion process. The fabric mesh is thinner than the resulting membrane so that the fabric mesh will have a protective coating of thermoplastic on the first and second sides of the fabric mesh. The fabric mesh can be a woven mesh or a non-woven mesh.

The membranes are normally prepared in thicknesses of from 30 to 100 mils, although thicker membranes may be prepared and it may be possible to prepare membranes thinner than 30 mils.

Each of the rollers on the extruder is preferably a powered roller. Normally the rollers are run at the same circumferential speed. However, the first and second rollers may be operated at different speeds to yield a particular type of finish on the resulting membrane. Preferably, at least one of the rollers is rotating at the same circumferential speed as the speed that the membrane is being drawn out of the gap of the extruder rollers.

A particular finish can be applied to the first side of the membrane by imparting a particular finish to the surface of the first roller. The first roller can be polished, smooth, roughened, or imprinted with a particular design, and the like, which is imparted into the first side of the membrane which is relatively plastic when it leaves the gap 16.

The size of the rollers does not appear to be crucial to the process. Rollers having a diameter of 14" have been found to be quite satisfactory although smaller and larger rollers would work equally as well. The second and third rollers 14 and 20 are normally cooled with ambient temperature water; and the first roller 12 is heated with water and steam to bout 105° C. to maintain the temperature of the polypropylene based thermoplastic olefin to at least 100° C. The thermoplastic is cooled below its melting temperature before it leaves contact with the surface of a roller, that is, the first side 45A of the membrane of 44 is cooled to below its melting temperature before it leaves the surface of the first roller 12 and the second side 45B of the membrane is cooled to below its melting temperature before it leaves the surface of the cooling roller 20.

Although the open mesh fabric mesh is normally drawn into the center of the gap, that is to the middle of the gap 16 between the first and second rollers, the fabric can be drawn off center into the gap. When it is desired to have the fabric mesh in the center of the membrane product, normally equal amounts of thermoplastic are extruded from the first and second nozzles 24 and 26. However, different amounts of thermoplastic can be extruded from the first and second nozzles to make the first or second side of the membrane thicker. Sufficient thermoplastic is employed to fully cover the fabric mesh.

Figure 2:
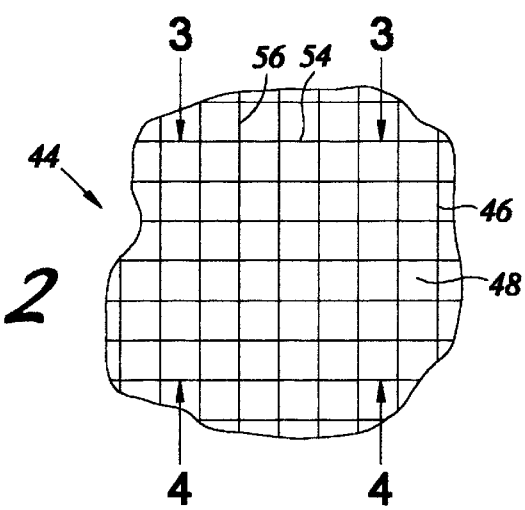
FIG. 2 is a partial sectional top view of the fabric mesh reinforced thermoplastic membrane of the present invention.
Figure 3:
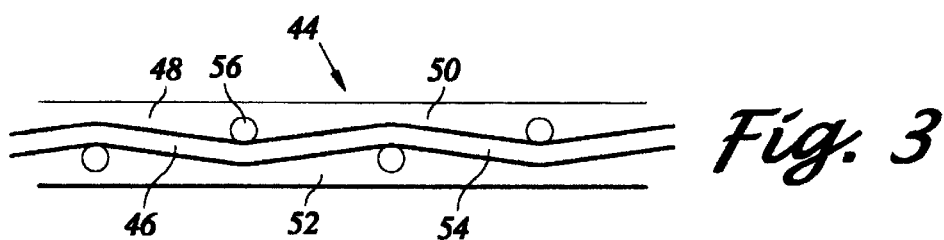
FIG. 3 is a cross sectional view taken along lines 3—3 of FIG. 2.

Referring to FIG. 2, the membrane 44 comprises open mesh fabric mesh 46 encapsulated by thermoplastic 48. As shown in FIG. 3, the lateral mesh fabric fibers or strands 54 and the longitudinal mesh fabric fibers or strands 56 of the open mesh fabric mesh 46 are encapsulated between the first side 50 of the thermoplastic membrane 44 and the second side 52 of the thermoplastic membrane. Although the open mesh fabric mesh is shown in the central region of the membrane, the mesh fabric can be located off center depending upon the particular need.

Figure 4:
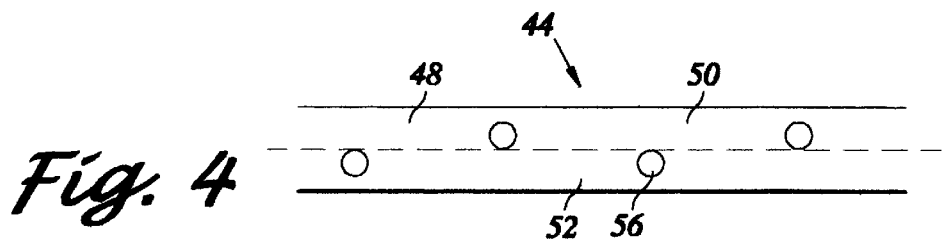
FIG. 4 is a cross sectional view taken along lines 4—4 of FIG. 2.

The dotted line in FIG. 4 identifies the zone fusion between the first extruded thermoplastic and the second extruded thermoplastic when equal amounts of thermoplastic are employed in the manufacture of the membrane. The two extrusions of thermoplastic are completely fused together and there is no line of demarkation in the membrane 44 if the same thermoplastic is used to produce the membrane. The membrane is a single layer membrane, not a two layer membrane. Accordingly, the resulting membrane cannot be delaminate. It is particularly important during the manufacture of the membrane that the extruded thermoplastic be heated to a sufficiently high temperature so that the two extrusions of molten thermoplastic can flow into and through the open mesh of the open mesh fabric mesh and fuse with each other before the melted thermoplastic has cooled by the first and second rollers to below its fusion or melting temperature. It is only in that way that the monolithic membrane of the present invention can be produced. The open mesh fabric membrane can be woven from plastic, natural fiber or metal fibers or strands. Alternatively, nonwoven mesh of plastic or metal mesh can also be employed in the present invention.

When the monolithic membrane is to be employed for roofing, the first layer 48 will preferably be pigmented with a reflective pigment, such as titanium dioxide or particulate aluminum metal. Preferably, the second side 52 of the membrane 44 will be pigmented with carbon black pigment. However, both the first and second side can be pigmented with light reflective pigment. If desired, either sides or both sides can be pigmented with other colored pigmented materials for decorative effects. When the monolithic membrane is to be used as liners for canals, reservoirs, pits or the like, the thermoplastic is normally pigmented with a black pigment such as carbon black. Carbon black is an excellent UV absorber and protects the thermoplastic from atmospheric oxidation.

Although not shown in the figures, the surface of either the first side 50 or the second side 52, or both sides, can be manufactured with different types surface finishes. for relatively thin membranes, the first side can be finished with a smooth or brushed finish and the second side normally reflects the open mesh fabric.

The membrane can be prepared with two or more layers of open mesh fabric mesh as long as there is sufficient spacing between the open meshes to permit the molten thermoplastic to enter into and go through the open mesh to complete encapsulate the mesh fiber and fuse the two extrusions of thermoplastic together.

What is claimed is:

1. A method of manufacturing a fabric mesh reinforced monolithic thermoplastic membrane having first and second sides of thermoplastic comprising drawing an open mesh fabric mesh into a throat between parallel, spaced apart first and second calender rollers of a membrane extruder, the first and second calender rollers separated by a gap, the mesh having first and second sides; simultaneously extruding a molten first thermoplastic into the throat of the two rollers between the first side of the open mesh fabric mesh and the first roller and a molten second thermoplastic into the throat between the second side of the open mesh fabric mesh and the second roller; and drawing the composite of molten first and second thermoplastics and the open mesh fabric mesh through the gap between the first and second calender rollers to force molten first and second thermoplastic into and through the open mesh of the fabric mesh to encapsulate the open mesh fabric mesh and fuse the first and second molten thermoplastic together to form a single layer and to produce the fabric mesh reinforced monolithic thermoplastic membrane having first and second sides of thermoplastic, the first and second thermoplastics being compatible and fusible with each other, the first calender roller heated to maintain the temperature of the fabric mesh reinforced monolithic thermoplastic membrane above 100° C., the temperature of the fabric mesh reinforced monolithic thermoplastic membrane being maintained above 100° C. after being drawn from the throat to complete fusing of the thermoplastic by keeping the first side of the fabric mesh reinforced monolithic thermoplastic membrane in contact with the first calender roller, the second calender roller cooled with ambient temperature water to cool the second side of the thermoplastic of the resulting fabric mesh reinforced monolithic thermoplastic membrane to a temperature below the melting temperature of the first and second thermoplastics as it leaves the gap between the first and second calender rollers.

2. The method according to claim 1 wherein after contacting the first side of the fabric mesh reinforced monolithic thermoplastic membrane on the first roller to complete the fusing of the thermoplastics, the second side of the fabric reinforced monolithic thermoplastic membrane is contacted with the surface of a cooled roller to cool the second side and solidify it.

3. The method according to claim 2 wherein the fabric mesh reinforced monolithic thermoplastic membrane after cooling and solidifying the second side of the membrane on the cooled roller is cooled with air to ambient temperature.

4. The method according to claim 1 wherein the open mesh fabric mesh is maintained under slight tension while being drawn into the throat to maintain the fabric mesh in a substantially planar state.

5. The method according to claim 1 wherein the first and second calender rollers are rotated at the same circumferential speed.

6. The method according to claim 1 wherein the first and second calender rollers are rotated at different circumferential speeds.

7. The method according to claim 1 wherein the open mesh fabric mesh is drawn into the center of the gap between the first and second calender rollers and equal amounts of molten first and second thermoplastic are extruded into the throat.

8. The method according to claim 1 wherein the open mesh fabric mesh is drawn into the center of the gap between the first and second calender rollers and a greater amount of molten first thermoplastic is extruded into the throat than the amount of molten second thermoplastic extruded into the throat.

9. The method according to claim 1 wherein the open mesh fabric mesh is drawn into the gap between the first and second calender rollers closer to the second calender roller than to the other roller, and a greater amount of the molten first thermoplastic is extruded into the throat than the amount of molten second thermoplastic extruded into the throat.

10. The method according to claim 1 wherein open mash fabric mesh is drawn into the gap between the first and second calender rollers closer to the first calender roller than to the other roller and a greater amount of the molten second thermoplastic is extruded into the throat than the amount of molten first thermoplastic extruded into the throat.

11. The method according to claim 1 wherein the second thermoplastic is cooled below its melting temperature before it leaves contact with the second calender roller.

12. The method according to claim 1 wherein the first thermoplastic is cooled below its melting temperature before it leaves contact with the first calender roller.

13. The method according to claim 1 wherein the first and second thermoplastics have a melt index of at least 1.0 when tested at 2.14 Kg at 109° C.

14. The method according to claim 13 wherein the first and second thermoplastics have similar melt indexes.

15. The method according to claim 1 wherein the first and second thermoplastics are polypropylene based thermoplastic olefins with a melt index of at least 1.0 when tested at 1.4 Kg at 109° C.

16. The method according to claim 1 wherein the gap between the first and second calender rollers is between 30 and 100 mils to produce a fabric mesh reinforced monolithic thermoplastic membrane having a thickness of 30 to 100 mils.

17. The method according to claim 1 wherein the first calender roller is rotated at the same circumferential speed as the speed that the fabric mesh reinforced monolithic thermoplastic membrane is drawn out of the gap.

18. The method according to claim 15 wherein the first calender roller is heated with water and steam to about 105° C. to maintain the temperature of the first and second thermoplastics to at least 100° C. to complete fusion of the two thermoplastics.

19. The method according to claim 1 wherein the temperature of the first thermoplastic on the fabric mesh reinforced monolithic thermoplastic membrane is cooled below its melting temperature before it leaves contact with the surface of the first calender roller.

20. The method according to claim 1 wherein the second calender roller cools the second side of the fabric mesh reinforced monolithic thermoplastic membrane before it leaves the surface of the second calender roller.

* * * * *

UNITED STATES PATENT AND TRADEMARK OFFICE
CERTIFICATE OF CORRECTION

PATENT NO. : 6,054,178
DATED : April 25, 2000
INVENTOR(S) : Howells

It is certified that error appears in the above-identified patent and that said Letters Patent is hereby corrected as shown below:

Column 1, line 10, "a" should be --an--.

Column 2, line 60, "85°" should be --85°C--.

Column 2, line 60, "110°" should be --110°C--.

Column 4, line 27, after "second", "roller" should be --rollers--

Column 4, line 29, "approximate" should be --proximate--.

Column 4, line 31, "approximate" should be --proximate--.

Column 4, line 35, "plainer" should be --planar--.

Column 4, line 35, after "thermoplastic", insert --32--.

Column 6, line 12, "bout" should be --about--.

Column 7, line 4, "side" should be --sides--.

Column 7, line 5, "sides" should be --side--.

Column 7, line 15, after "types", insert --of--.

Column 7, line 15, "for" should be --For--.

UNITED STATES PATENT AND TRADEMARK OFFICE
CERTIFICATE OF CORRECTION

PATENT NO. : 6,054,178
DATED : April 25, 2000
INVENTOR(S) : Howells

It is certified that error appears in the above-identified patent and that said Letters Patent is hereby corrected as shown below:

Column 8, line 37, "mash" should be --mesh--.

Signed and Sealed this

Twentieth Day of March, 2001

Attest:

NICHOLAS P. GODICI

*Attesting Officer*     *Acting Director of the United States Patent and Trademark Office*